United States Patent [19]

Enomoto

[11] Patent Number: 4,696,555
[45] Date of Patent: Sep. 29, 1987

[54] ELECTRIC REMOTE CONTROL MIRROR APPARATUS

[75] Inventor: Masao Enomoto, Hadano, Japan

[73] Assignee: Ichikoh Industries Limited, Tokyo, Japan

[21] Appl. No.: 862,960

[22] Filed: May 14, 1986

[30] Foreign Application Priority Data

| May 14, 1985 | [JP] | Japan | 60-70080[U] |
| May 14, 1985 | [JP] | Japan | 60-70081[U] |
| May 14, 1985 | [JP] | Japan | 60-70082[U] |
| May 14, 1985 | [JP] | Japan | 60-70083[U] |
| May 27, 1985 | [JP] | Japan | 60-77628[U] |
| Apr. 4, 1986 | [JP] | Japan | 61-049756[U] |
| Apr. 14, 1986 | [JP] | Japan | 61-054722[U] |
| Apr. 14, 1986 | [JP] | Japan | 61-054723[U] |

[51] Int. Cl.[4] .......................... B60R 1/02; G02B 7/18
[52] U.S. Cl. ..................... 350/634; 350/637; 248/900; 248/487
[58] Field of Search ............... 350/634, 633, 636, 637; 248/487, 481, 483, 484, 900, 549

[56] References Cited

U.S. PATENT DOCUMENTS

| 4,076,392 | 2/1978 | Suzuki et al. | 350/634 |
| 4,401,289 | 8/1983 | Fisher et al. | 248/483 |
| 4,498,738 | 2/1985 | Kumai | 248/900 |
| 4,504,117 | 3/1985 | Mittelhauser | 350/634 |
| 4,555,166 | 11/1985 | Enomoto | 350/634 |

Primary Examiner—Jon W. Henry
Attorney, Agent, or Firm—Schwartz, Jeffery, Schwaab, Mack, Blumenthal & Evans

[57] ABSTRACT

An electric remote control mirror apparatus comprising pivotably supporting means fixed within a mirror housing for pivotably supporting the mirror body having a mirror by utilizing a pivot connection mechanism composed of a boss portion mounted on the mirror body and a concave portion mounted on a drive casing to be resiliently fitted to the boss portion, a mirror driving mechanism composed of two ball bases mounted on the mirror body and disposed on two lines orthogonal to each other, threaded rods each of which has a ball to be fitted to the ball base and mounted in the direction parallel to the axial direction of the pivot connection mechanism thereby slanting the mirror body, and O-ring for stably supporting the threaded rods and surely sealing the threaded rods from water and/or dust, wherein a stable movement of the mirror is achieved and the mirror is stably maintained even when the mirror is affected with wind pressure and/or vibration due to automobiles.

13 Claims, 8 Drawing Figures

ELECTRIC REMOTE CONTROL MIRROR APPARATUS

BACKGROUND OF THE INVENTION

1. Field of the Invention

The present invention relates to an electrically driven remote-controlled mirror apparatus used for an automobile, more particularly to a mirror apparatus which is designed such that a driver of the automobile can remotely control the rotation of a mirror mounted on the automobile at the driver's seat in order to obtain a rear vision and side visions suitably.

2. Related Art Statement

In a conventional electric remote control mirror apparatus in which a rear or side vision suitable for a driver of an automobile is obtained by moving a mirror surface, there are provided a mechanism for pivotably supporting a mirror body fixing a mirror or a backing member trough a pivot connection and a mechanism for rotating the mirror body around the pivot connection in the vertical and horizontal directions.

It is required for such conventional electric remote control mirror apparatus, to provide the mechanism including the pivot connection for pivotably and stably supporting the mirror and the mechanism for smoothly slanting the mirror around the pivot connection, and particularly to provide a pair screw rods for rotating the mirror around the vertical axis as well as the horizontal axis by using an electric motor through a reduction gear. Therefore, there is a problem that the screw rods are not moved smoothly because each screw rod is not supported stably when it is moved forwardly or backwardly in the state that the rotation of the screw rod is inhibited. In actual, a ball portion fixed on the end point of the screw rod, which ball portion being fitted into a ball base mounted on a mirror base, moves circularly around the pivot connection, therefore the screw rod is given with a degree of freedom of movement to follow to the movement of the ball portion. For example, U.S. Pat. No. 4,076,392 discloses a remote control mirror apparatus in which there is provided an axial bore on a block having a ball portion of the end point portion thereof and a pin having a screw portion rotatably supported on a casing, and the screw poriton is disposed within the axial bore and the block has a needle contacting to the screw portion of the pin. By rotating the pin the block is effected with an axial movement, however the axial movement is undesirably not smooth thereby moving in the direction perpendicualr to the axial direction, because the pin contacts in a point contact to the block through the needle. Furthermore, U.S. Pat. No. 4,324,454 discloses a remote control mirror apparatus in which there is provided three catches at the end portion of a hollow-cylindrical adjusting nut having a ball portion at the end point thereof and each of the catches is in pressing contact with the bottom portion of a male screw portion of the adjusting member. The adjusting nut is adapted to effect an axial movement by rotating the male screw portion of the adjusting member. However, the adjusting member per se is adapted to effect a conically swing on a root, therefore a pressing contact force required for contacting the three catches of the adjusting nut with the male screw portion of the adjusting member is undesirably moving the adjusting nut in the direction perpendicular to the axial direction.

SUMMARY OF THE INVENTION

The object of the present invention is to present an electric remote control mirror apparatus in which the disadvantages of the above-mentioned conventional remote control mirror apparatus are obercome.

Another object of the present invention is to present an electric remote control mirror apparatus in which a pair of screw rods for slanting a mirror is stably supported and a smooth axial movement thereof can be achieved.

Another object of the present invention is to present an electric remote control mirror apparatus in which a sealing between a screw rod and a drive case for receiving each screw rod in a free-movable state is surely obtained within a region of dgree of freedom of a pair of screw rods for slanting a mirror.

Another object of the present invention is to present an electric remote control mirror apparatus in which upon an axial movement of a pair of screw rods for slanting a mirrir, the axial movement is surely maintained even when an external force such as a vibration is applied thereto.

Still a further object of the prsent invention is to present an electric remote control mirror apparatus in which there is provided a pivot connection mechanism which is designed to provide a uniform rotation resistance and to be automatically fabricated very easily.

BRIEF DESCRIPTION OF THE DRAWINGS

Other features, additional objects, and many of the attendant advantages of the present invention will readily be appreciated as the same becomes better understood by reference to the following detailed description of a preferred embodiment when considered in connection with the appended drawing in which.

DETAILED DESCRIPTION OF THE PREFERRED EMBODIMENT

Referring now to FIGS. 1 to 8 a constitution of an embodiment of the electric remote control mirror apparatus of the present invention is shown.

Figure 1:
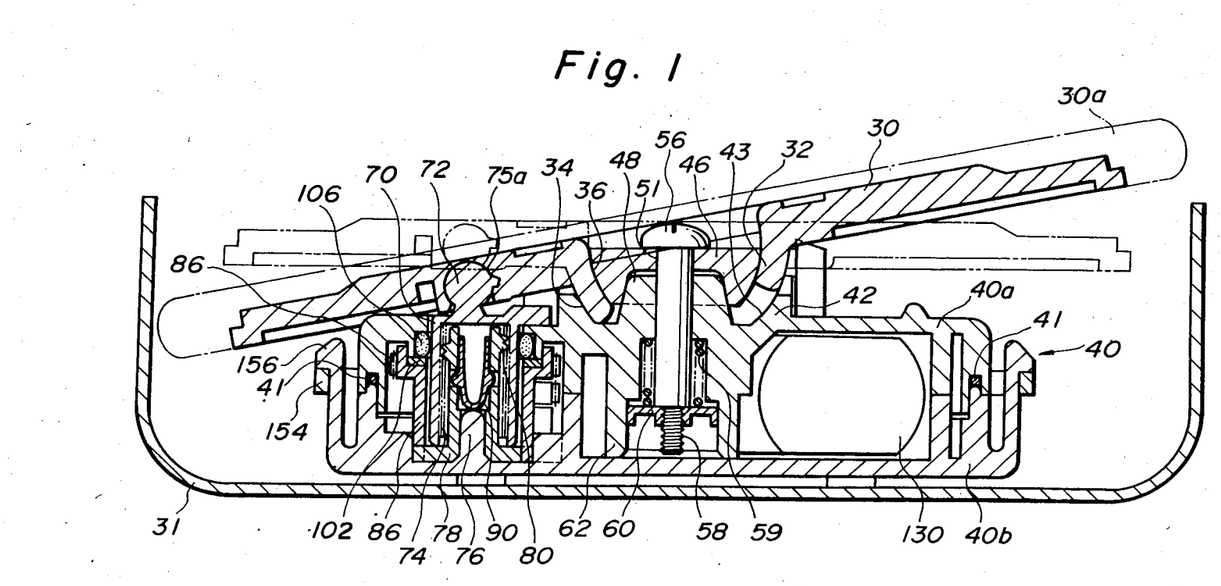
FIG. 1 is a sectional view showing an embodiment of the electric remote control mirror apparatus of the present invention.

In FIG. 1 showing a sectional view of the remote control mirror apparatus, numerals 30 and 30a designate a mirror body and a mirror to be fixed to the mirror body, respectively. The mirror body 30 is fixed in a mirror housing 31 and is supported rotatably with respect to a drive case 40 including a driving unit for rotating the mirror body 30, as mentioned hereinafter.

Figure 2:
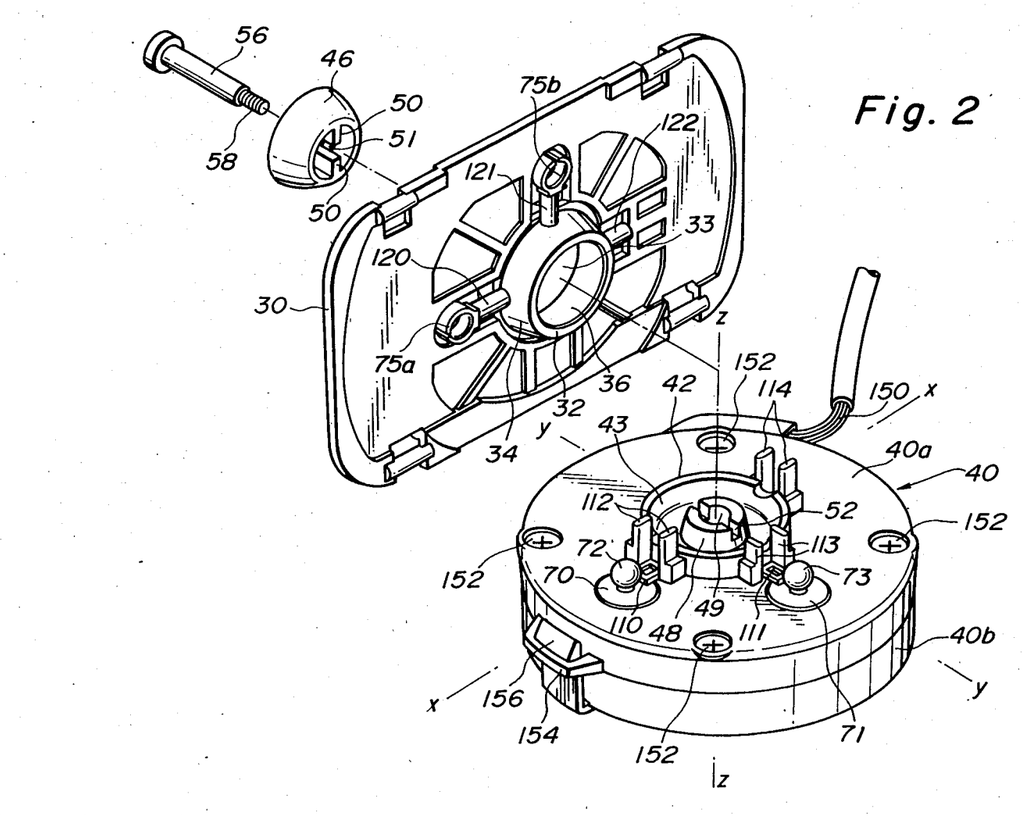
FIG. 2 is a partially broken perspective view showing a relationship in connection between a drive case and a mirror body.

The drive case 40 is formed in a cyindrical closed body and composed of an upper casing 40a and a lower casing 40b as shown in FIG. 2. There is provided a O-ring 41 between the upper casing 40a and the lower casing 40b thereby inhibiting the insertion of external object such as water and/or dust.

The mirror body 30 is supported by supporting means. The supporting means includes a pivot connection 44 composed of a ball base 42 having a concave surface 43 formed integrally on the front surface of the upper casing 40a and a hollowed boss portion 32 having a boss surface 34 with a curvature fitting to the concave surface 43 of the ball base 42, the hollowed boss portion 32 being integrally formed on the back surface of the mirror body 30.

At the central portion of the ball base 42, there is integrally provided a projected portion 48 in a conical formation having a through hole 49 formed coaxially with the pivot axis of the pivot connection 44. At the top portion of the projected portion 48, there is provided a kerf 52 for dividing the top portion of the projected portion 48 into two parts.

Figure 3:
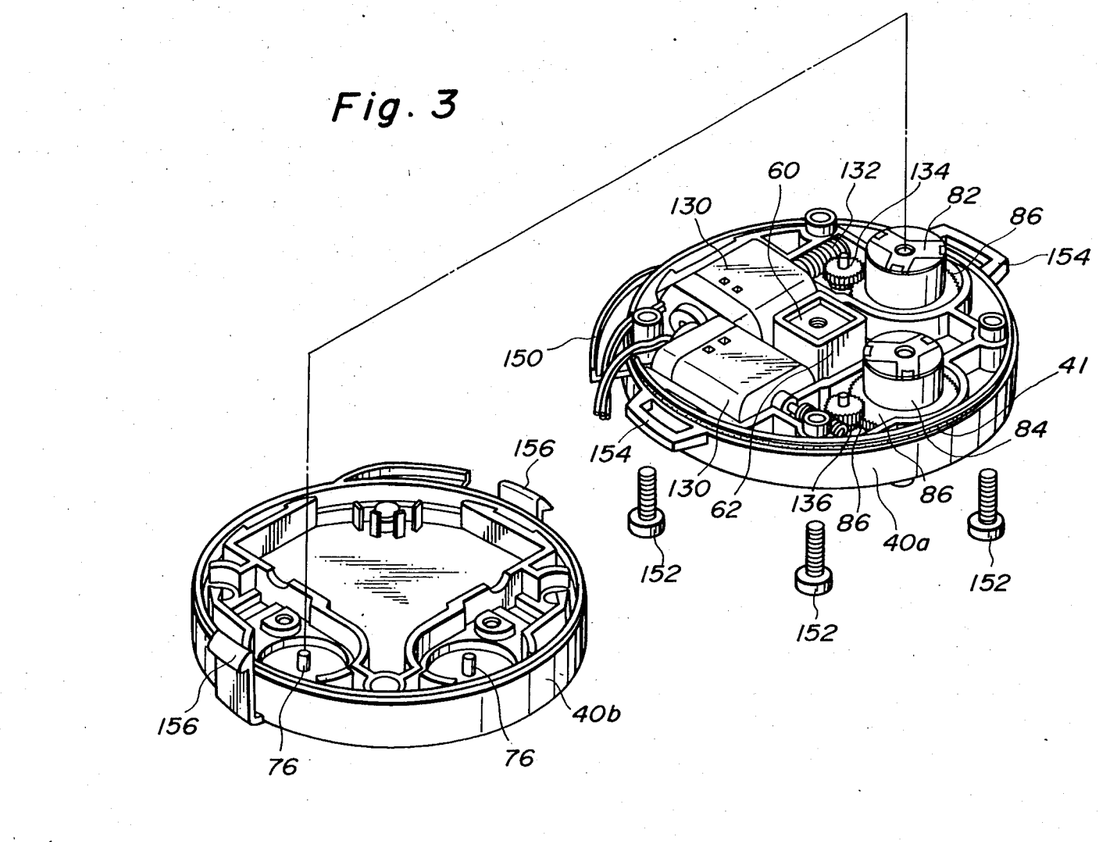
FIG. 3 is a partially broken perspective view showing constitution elements disposed within the drive case, in which a lower casing is removed.
Figure 5:
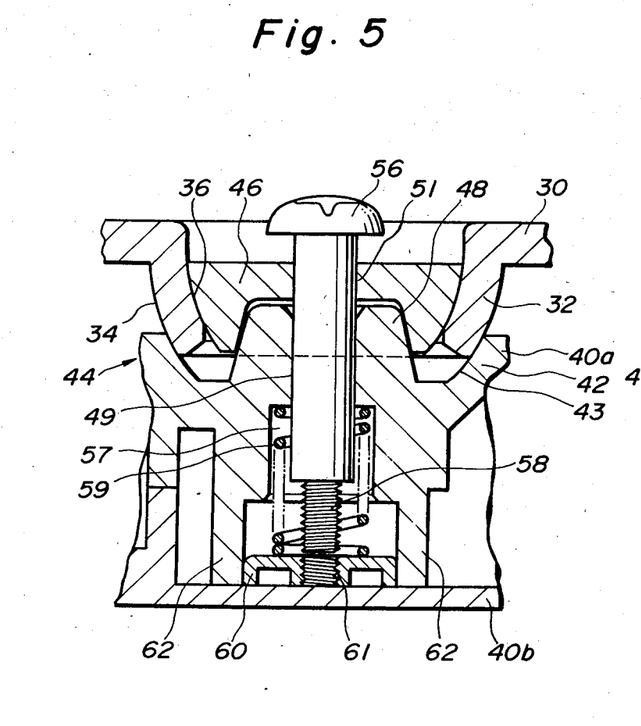
FIGS. 5 and 6 are sectional views showing the connection between the mirror body and the drive case by a pivot connection.
Figure 6:
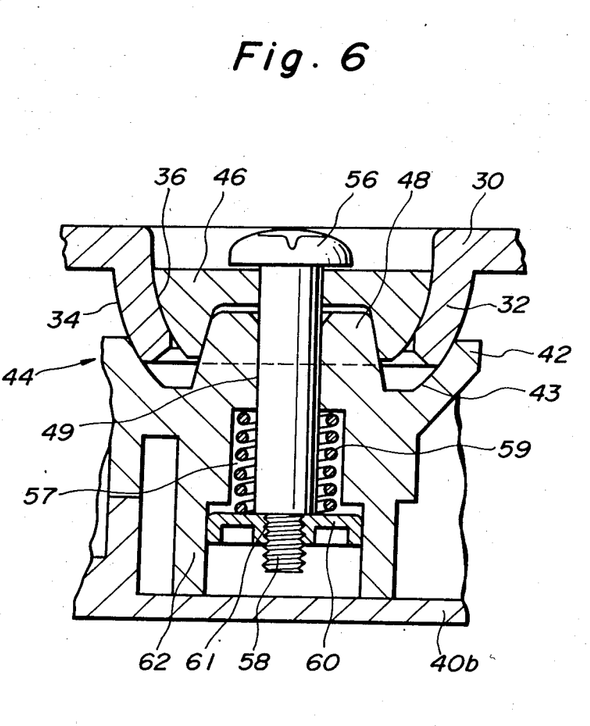

On the other hand, there is provided a pressure applying member 46 having a boss surface which is adapted to be fitted to an inner surface 36 of the hollowed boss portion 32 of the mirror body 30, and a through hole 51 is provided at the central portion of the pressure applying member 46, the through hole 51 being formed coaxially with the through hole 49 and having substantially the same diameter as that of the through hole 49 of the ball base 42. At the end of the pressure applying member 46, there is provided a recess poriton to be fitted with the projected portion 48 of the ball base 42 and a rib portion 50 to be fitted with the kerf 52 as shown in FIG. 2. The other end of the pressure applying member 46 is formed in a plane surface and contacted to a head portion of a bolt 56 extending into the drive case 40 by passing through the through holes 51 and 49. A screw portion 58 of the bolt 56 has the diameter smaller than the shaft portion and is secrewed to the screw portion 61 of a nut 60 having a substantial squar formation. A compression coil spring 59 is disposed around the bolt 56 and between the back surface of the upper casing 40a and the nut 60, as shown in FIGS. 5 and 6. As shown in FIGS. 3, 5 and 6, there is provided a box-like projection wall composed of four walls 62 projecting from the back surface of the upper casing 40a toward the lower casing 40b, the coil spring 59 being received in the box-like projection wall and the nut is also received therein such that the nut 60 can move in the axial direction of the bolt 56. The periphery of the nut 60 is contacted to each of walls 62 and the compression coil spring 59 is adapted to supply the resilient force to the surface of the nut 60. By this resilient force the bolt 56 is applied with the pressing force in the downward direction, whereby the pressure applying member 46 is depressed by the head portion of the bolt 56 against the inner surface 36 of the hollowed boss portion 32 of the mirror body 30 and further the boss surface 34 of the hollowed boss portion 32 of the mirror body 30 is depressed with a uniform force against the concave surface 43 of the ball base 42.

Furthermore, the rib portion 50 of the pressure applying member 46 fits to the kerf 52 mounted at the bottom portion of the ball base 42, therefore the rotation of the pressure applying member 46 around the pivot shaft is inhibited. Therefore, the hollowed boss portion 32 of the mirror bady 30 is stably supported between the ball base 42 and the pressure applying member 46 by utilizing a suitable friction force.

The rotation resistance of the pivot connection 44 depends on the resilient force of the compression coil spring 59 and the frictional force produced between the hollowed boss portion 32 of the mirror body 30 and the pressure applying member 46 and further between the boss surface 34 of the hollowed boss portion 32 and the concave surface 43 of the ball base 42. The rotation resistance is suitably selected such that the mirror body 30 does not move or vibrate by an external force e.g. wind pressure or the vibration due to running of the automobile.

When the mirror body 30 is assembled to the upper casing 40a, the compression coil spring 59 and the nut 60 are first received within the box-like space enveloped by the four walls 62 of the upper casing 40a and then the upper casing 40a is fitted to the lower casing 40b. Next, the mirror body 30 is disposed in such a manner that the hollowed boss portion 32 of the mirror body 30 fits to the concave surface 43 of the ball base 42, and the boss surface of the pressure applying member 46 is fitted to the inner surface 36 of the hollowed boss poriton 32 of the mirror body 30 and further the rib portion 50 is fitted to the kerf 52 of the ball base 42. Then the bolt 56 is inserted into the through hole 51 of the pressure applying member 46 and the through hole 49 located at the central portion of the ball base 42, from the side of the mirror body 30, whereby the end point of the screw portion 58 of the belt 56 is screwed to the female screw 61 of the nut 60, as shown in FIG. 5. Then, the bolt 56 is rotated in the state as shown in FIG. 5 whereby the bolt 56 is screwed into the female screw 61 of the nut 60, since the nut 60 is inhibited to rotate by the box-like wall 62. At this time, the nut 60 moves in the direction of the pivot shaft namely the upward direction in FIG. 5, and the compression coil spring 59 is gradually compressed. As shown in FIG. 6, when the fastening due to the bolt 56 is completed, the surface on which the compression coil spring 59 contacts to the nut 60 is adapted to be apart from the back surface of the upper casing 40a so as to provide the resilient force due to the coil spring 59 against the bolt 56 effectively.

As mentioned above, according to the constitution of the pivot connection 44, the square nut 60 is automatically mounted coaxially with the pivot shaft as a stopper of the coil spring 59 and by rotation of the bolt 56, a predetermined resilient force is easily obtained, therefore such constitution of the pivot connection 44 is excellent in view of an automatic fabrication.

Figure 4:
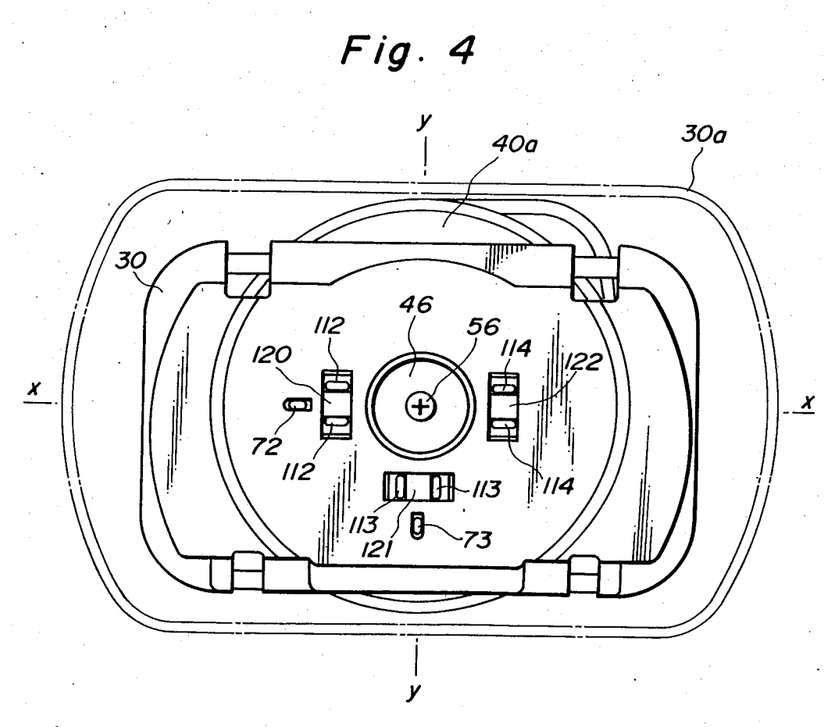
FIG. 4 is a front view of the electric remote control mirror apparatus, in which the mirror is shown by an imagination line.
Figures 7, 8:
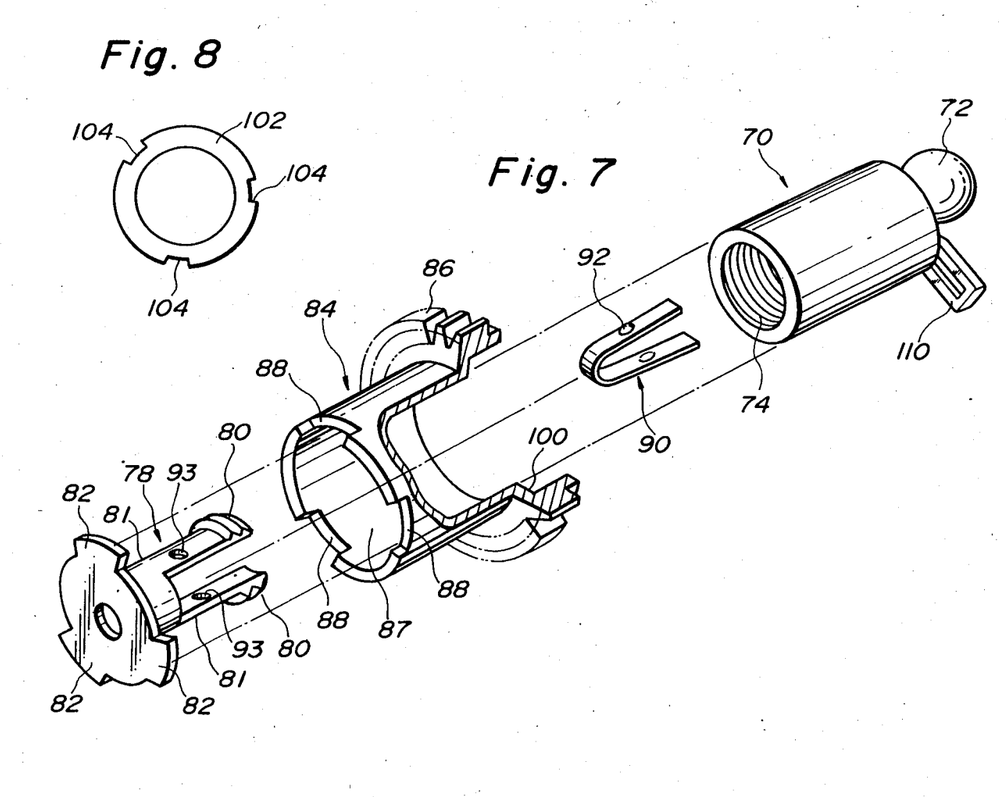
FIG. 7 is a partially broken enlarged view showing the relationship among a screw rod, a rotating member and a gear member.
FIG. 8 is a front view showing a washer member.

On the other hand, there are provided screw rods 70 and 71 for moving or slanting the mirror body 30 in the drive case 40. Each screw rods 70 or 71 is drived by an electric motor 130 mounted in the drive case 40 as mentioned hereinafter. As shown in FIG. 8, each of the screw rods 70 and 71 is formed in a hollowed cylinder and there is provided ball portions 72 and 73 at one end of the screw rods 70 and 71 respectively and a female screw 74 is formed at inner surface of each screw rod 70 or 71. Each of the ball portions 72 and 73 is fitted to each of the ball bases 75a and 75b formed at the back surface of the mirror body 30 respectively. As shown in FIGS. 2 and 4, the ball bases 75a and 75b are located on two straight liens perpendicular to each other, i.e. x—x axis and y—y axis in FIG. 4, respectively, the two straight lines being pass through the axis of the pivot connection 44.

If either of the screw rods 70 and 71 is moved forwardly or backwardly, the mirror bosy 30 may be moved or slanted around the x—x axis or y—y axis.

When each of the screw rods 70 and 71 moves forwardly or backwardly through an opening mounted on the upper casing 40a, the periphery surface of each of the screw rods 70 and 71 is contacted, as shown in FIG. 1, to the inner surface of each of O-ring 106 made of rubber material disposed at the end portion of each of the openings. By using the O-ring 106, the screw rods 70 and 71 are stably supported and any insertion of water and/or dust from an external into the drive case 40, is prevented.

As shown in FIG. 7, there are provided rotation members 78 each of which has a male screw 80 and the rotation members 78 are coaxially disposed to the screw rods 70 and 71 respectively, and the respective male screws 80 are screwed into the feamle screw 74 of the screw rods 70 and 71 respectively. Each of the rotation members 78 has a pair of arm portions 81 at the end point of which the male screw 80 is provided. The rotation member 78 is rotatably supported on the supporting shaft as shown in FIG. 1. The paired arm portions 81 and 81 are made of plastic material thereby providing a resilient force in the direction perpendicular to the axial direction. The male screw portions 80 and 80 formed at the end point of the arm portions 81 and 81 respectively, have two screw threads respectively in this embodiment. It is better to reduce the number of the screw threads of the male screw poritons 80 and 80, therefore only one screw thread may be effective for coupling the male screw thread to the female screw portions 74 and 74 of the screw rods 70 and 71 thereby transmitting the rotation fo the rotation members 78 and 78 to the screw rods 70 and 71 respectively. The paired arm portions 81 and 81 are disposed in an offset portion by 180° with respect to the rotation axis of the rotation members 78 and 78, namely in an opposite position with each other, and there is disposed a substantial U-shaped plate spring 90 between two arm portions 81 and 81 in order to press the male screw portions 80 and 80 against the female screw portion 74 of the screw rod 70. The periphery of each of the screw rods 70 and 71 is supported by the O-ring 106, and the inner surface of each of the screw rods 70 and 71 is supported by the arm portions 81 and 81.

As shown in FIG. 7, there are provided two small projections 92 and 92 which are disposed opposite to each other on the plate spring 90 and the small projections 92 and 92 can fit to two small holes 93 and 93 mounted on the paired arm portions 81 and 81 respectively thereby preventing the plate spring 90 from being removed from the arm portion 81. According to the above constitution of the arm portions 81 and 81 and the plate spring 90, the end portions of the U-shaped plate spring 90 contact to the inner surfaces of the arm portions 81 and 81 corresponding to the male screw poritons 80 and 80 thereby pressing the male screw portions 80 and 80 against the female screw 74 of the screw rod 70 or 71. Therefore, a sure and stable screw coupling can be achieved therebetween. In this embodiment, there is provided a single pair of the arm portions 81 and 81 in an offset position by 180° with respect ot the rotation axis, however it may be possible to provide three arm portions offset by 120° to each other around the rotation axis.

Numerals 84 and 84 designate gear member mounted coaxially with rotation members 78 and 78 respectively, thereby rotating integrally with the rotation members 78 and 78 respectively. As shown in FIG. 7, each of the gear members 84 and 84 is formed in a hollowed cylinder for receiving the screw rod 70 including the arm portions 81 and 81 of the rotation member 78 therein.

As is clearly shown in FIG. 7, at one end of the gear member 84, there are provided three recesses 88 at the periphery thereof. The three recesses 88 are adapted to receive three stoppers 82 formed at the end portion of the arm portion 81 of the rotation member 78 which are extending in the radial direction, respectively. By such connection between the three recesses 88 and the three stoppers 82, the rotation member 78 can be rotated together with the gear member 84. The other end of the gear member 84 has an enlarged-diameter portion and a spur gear 86 is provided at the periphery of the enlarged-diameter portion.

The spur gear 86 is coupled to a worm gear 132 fixed on the output shaft of an electric motor 130 through a double-geared spur gear as shown in FIG. 3. The inner surface extending in the axial direction of the enlarged-diameter portion of the gear member 84 is smoothly contacted to the peripheral surface of the annular wall formed on the back surface of the upper casing 40a as shown in FIG. 1, on the other hand the inner surface 100 ( in FIG. 7 ) extending in the radial direction of the enlarged-diameter portion of the gear member 84 is smoothly contact to the surface of an annular washer member 102 as shown in FIG. 8. The washer member 102 has recess portion, e.g. three recess portions 104 as shown in FIG. 8, and the recess portions 104 are fitted to projected portions ( not shown ), e.g. three projected protions, formed at the end of the annular wall of the upper casing 40a. Therefore the washer 102 is adapted to be inhibited to rotate as the gear member 84 is rotated. Furthermore, as shown in FIG. 8, the other surface of the washer member 102 is contacted to the O-ring 106 having a resilient force due to a rubber material. By the resilient force of the O-ring 106, the washer 102 is adapted to be depressed to the inner surface 100 ( FIG. 7 ) of the gear member 84. The gear member 84 and the washer member 102 are preferably made of the material having a small coefficient of friction such as synthetic resin. The washer member 102 is adapted to be fixdely held against the upper casing 40a when the gear member 84 is rotated and to affect no influence to the rotation of the gear member 84. The washer member 102 as well as the O-ring 106 surely prevents the drive case 40 from an external object such as water and/or dust.

According to the electric remote control mirror apparatus as an embodiment of the present invention, the center axis of the cylindrical portion of the screw rod 70 ( 71 ) is offset to the center of the ball portion 72 ( 73 ), and the screw rods 70 and 71 can move forwardly or backwardly in the axial direction as the rotation members 78 and 78 are rotated respectively. Furthermore, the ball portion 72 (73) of the screw rod 70 (71) moves in actual in a circular motion around the pivot connection 44, therefore there is provided a small gap between the inner surface of the cylindrical portion of the screw rod 70 (71) and the arm portions 81 and 81 of the rotation member 78, and further between the peripheral portion of the cylindrical portion of the screw rod 70 (71) and the inner surface of the gear member 84.

Furhtermore, an end portion at which the ball portion 72 (73) of the screw rod 70 (71) is mounted is provided with a projected piece 110 extending toward the center of the pivot connection 44 as shown in FIGS. 2 and 7, and further there is provided a pair of projected members 112 and 112 on the upper surface of the upper casing 40a, the projected member 112 and 112 being extending in the direction parallel to the axial direction of the screw rod 70 (71) and the projected piece 110 being sandwiched by the paired projected members 112 and 112. As is similar to the projected piece 110 and the paired projected member 112, there are provided a projected piece 111 and a pair of projected members 113 and 113 for the screw rod 71 and the ball portion 73 as shown in FIG. 2. Furthermore there are provided another pair of projected members 114 and 114 disposed opposite to the projected members 112 and 112 with respect to the ball base 43 of the pivot connection 44 and the projected members 114 and 114 as well as the projected members 112 and 112 are located on the x—x axis. The end portion of each of the projected members 112, 112, 113, 113, 114 and 114 is positioned within an opening provided on the mirror body 30, and the end portion is contacted to each of bars 120, 121 and 122 which are integrally formed with the hollowed boss portion 32 and extending outside fo the hollowed boss portion 32 in the radial direction, i.e. in the direction of x—x axis and y—y axis as shown in FIG. 2.

According to the arrangement mentioned above, when the screw rod 70 located on the x—x axis line is removed forwardly or backwardly, the corresponding projected piece 110 is guided by the corresponding paired projected members 112 and 112 and further the bar 120 of the mirror body 30 is supported or held by the paired projected members 112 and 112 during the slanting motion of the mirror body 30. At this time, the bar 121 located on the y—y axis line is restricted to move in the x—x axis direction by the paired projected members 113 and 113, therefore the mirror body 30 is prevented from moving in the x—x axis direction when the screw rod 70 is moved forwardly or backwardly, even if the mirror body 30 is affected with an external force such as vibration. Similarly, when the screw rod 71 located on the y—y axis line is moved forwardly or backwardly, the mirror body 30 can be slanted around the x—x axis, but the movement of the mirror body 30 around the y—y axis is restricted by the provision of the bars 120 and 122 and the projected members 112, 112, 114 and 114.

According to this embodiment, the central axis of each of the screw rods 70 and 71 is offset with the center of each of the ball portions 72 and 73 thereby preventing a rotation of each ball portion 72 (73) within each ball base 75a (75b). However even if no offset is provided, a rotation of each screw rod 70 (71) is surely prevented by the provision of each projected piece 110 (110) and the corresponding projected members 112 (113), therefore each screw rod 70 (71) can move forwardly or backwardly in the substantial z—z axis direction without any rotation. Furthermore, three projected members and three bars are provided in this embodiment, however the object of the arrangement can be achieved by providing only two projected members 112,112; 113 and 113 and two bars 120 and 121, or alternatively by further providing another pair of projected members oppositely to the projected members 113 and 113 with respect to the ball base 42 on the upper casing 40a and another bar on the mirror body 30 corresponding to another pair of projected members.

Furthermore, the rotation member 78 is formed separately with the gear member 84 in this embodiment, however they may be formed integrally.

A fabricating operation of the electric remote control mirror apparatus as mentioned above is effected as follows. As shown in FIG. 3, on the back surface of the upper casing 40a, the O-ring 106, the washer member 102, the gear member 84, the rotation member 78, the gear 134 and the motor 130 having the worm gear 132 mounted on the output shaft of the motor 130 are disposed in order, then the compression coil spring 59 and the nut 60 are disposed, an O-ring 41 (FIG. 1) being disposed at the periphery edge of the upper casing 40a, and the lower casing 40b being fitted to the upper casing 40a. Then, a pair of click members 156 and 156 formed on the side wall of the lower casing 40b are fitted to a pair of coupling members 154 and 154 formed on the side wall of the upper casing 40a respectively, thereby connecting the upper casing 40a to the lower casing 40b. Then, the upper and lower casings 40a and 40b are fixed by using screw bolts 152. Then, the screw rods 70 and 71 are inserted into the drive case 40 through openings mounted on the surface of the upper casing 40a respectively, in such a manner that the ball base poritons 75a and 75b of the mirror body 30 fit to the ball portions 72 and 73 of the screw rods 70 and 71 respectively and further the hollowed boss portion 32 of the mirror body 30 is fitted within the ball base 42 of the lower casing 40b. Furthermore, after the pressure applying member 46 is fitted to the inner surface of the hollowed boss portion 32, the screw bolt 56 is inserted through the through hole 51 of the pressure applying member 46 and the through hole 49 of the upper casing 40a. Then, the screw bolt 56 is rotated thereby screwing the male screw portion 58 of the bolt 56 to the female screw portion 61 of the nut 60, and a suitable compression force is applied to the compression coil spring 59.

In the above-mentioned fabricating operation, in the case where the rotation members 78 and 78 are coupled to the screw rods 70 and 71 respectively, the male screw threads 80 and 80 are easily inserted into the inner side of each of the screw rods 70 and 71 because the arm members 81 and 81 are easily deflected due to its resilient function upon the insertion. This is an advantage in the fabrication of the electric remote control mirror apparatus, therefore entire process of the fabrication of the electric remote control mirror apparatus can be effected automatically by an automatic machine.

While the present invention has been particualrly described with reference to specific embodiments thereof, it is to be understood that the words which have been used are words of description rather than limitation and that changes may be made within the purview of the appended claims without departing from the true scope and spirit of the present invention in its broader aspects.

What is claimed is:

1. An electric remote control mirror apparatus comprising:
 a mirror,
 a mirror body fixed to said mirror,
 a mirror housing for receiving said mirror body,
 supporting means fixed within said mirror housing for holding said mirror body in said mirror housing, said supporting means including a housing member fixed in said mirror housing and means for pivotably supporting said mirror body and connecting said mirror housing with said housing member, two ball bases mounted on the back side of said mirror body wherein one ball base lies on a lateral pivot axis of said mirror body and the other ball base lies on a longitudinal pivot axis of said mirror body and said lateral and longitudinal axes are perpendicualr to one another, a pair of hollowed cylindrical threaded rods each of which has an inner surface provided with screw threads and a ball portion at the end portion of said each threaded rod, said ball portion being adapted to be fitted to each of said ball bases respectively, and said pair of the hollowed cylindrical threaded rods being disposed in said ball bases, and each of said pair of hollowed cylindrical threaded rods being movable in its axial direction through a cylindrical hole mounted on said housing member, but each of said pair of hollowed cylindrical threaded rods being unrotatable with respect to said housing member, a pair of rotation members rotatably mounted in said housing member, each of said rotation members having at least two portions having a plurality of screw threads, said two portions spaced apart from each other and said plural screw threads being coupled to said screw threads of each of said threaded rods, gear means connected to each of said rotation members for transmitting a driving force to each of said rotation members, electric motor means for driving said rotation member through said gear means, and resilient O-rings fixedly disposed in said housing member and contacting the respective outer surfaces of said threaded rods, such that each threaded rod is supported by said housing member.

2. The electric remote control mirror apparatus according to claim 1, wherein said rotation member has a plurality of arm portions and there is formed a screw thread portion at the end point portion of each of said arm portions, said screw thread portion being resiliently contacted to the screw thread portion of said threaded rod.

3. The electric remote control mirror apparatus according to claim 2, wherein said screw thread portion includes at least one screw thread.

4. The electric remote control mirror apparatus according to claim 2, wherein said rotation member has two arm portions and a screw thread portion to be coupled to the screw thread portion of said threaded rod is formed at the end point of each of said two arm portions, and further comprises spring means for providing a resilient force to said two arm portions and coupling each of said screw thread portion of said two arm portions against said screw thread portion of each of said threaded rods.

5. An electric remote control mirror apparatus comprising;
a mirror,
a mirror body fixed to said mirror,
a mirror housing for receiving said mirror body,
supporting means fixed within said mirror housing for holding said mirror body in said mirror housing, said supporting means including a housing member fixed in said mirror housing and means for pivotably supporting said mirror body and connecting said mirror housing with said housing member,
two ball bases mounted on the back side of said mirror body wherein one ball base lies on a lateral pivot axis of said mirror body and the other ball base lies on a longitudinal pivot axis of said mirror body and said lateral and longitudinal axes are perpendicular to one another, a pair of hollowed cylindrical threaded rods, each of which has an inner surface provided with screw threads and a ball portion at the end portion of said each threaded rod, said ball portion being adapted to be fitted to each of said ball bases respectively, and said pair of the hollowed cylindrical threaded rods being disposed in said ball bases, and each of said pair of hollowed cylindrical threaded rods being movable in its axial direction through a cylindrical hole mounted on said housing member, a pair of rotation members rotatably mounted in said housing member, each of said rotation members having at least two portions having a plurality of screw threads, said two portions spaced apart from each other and said plural screw threads being coupled to said screw threads of each of said threaded rods, a pair of guiding members projected from said housing member in the direction substantially equal to the moving direction of said threaded rod, and said paired guiding members sandwiching a projected piece extending in the direction substantially perpendicular to the moving direction of said threaded rod, said projected piece being mounted at the end portion of said threaded rod, gear means connected to each of said rotation members for transmitting a driving force to each of said rotation members, electric motor means for driving said rotation members through said gear means, and resilient O-rings fixedly disposed in said housing member and contacting the respective outer surfaces of said threaded rods, such that each threaded rod is supported by said housing member.

6. The electric remote control mirror apparatus according to claim 5, wherein there are provided on said mirror body openings through which the end portions of said paired guiding members are passed respectively, and bars slidably contacted with the opposite walls of said paired guiding members.

7. The electric remote control mirror apparatus according to claim 6, wherein said bar is formed in a circular section and integrally formed with said mirror body.

8. The electric remote control mirror apparatus according to claim 1, further comprising a pair of projected members projected from said housing member in the direction substantially equal to the moving direction of said threaded rod and located on one line out of said two straight lines, openings mounted on said mirror base through which the end point of said paired projected members is passing and a bar slidably contacted to the opposite walls of said paired projected members.

9. The electric remote control mirror apparatus according to claim 8, wherein said bar is formed in a circular section and integrally formed with said mirror body.

10. The electric remote control mirror apparatus according to claim 1, wherein said gear means is formed in a hollowed cylinder adapted to receive said threaded rod and said rotation member, one end of said gear means being fixed to said rotation member, and the other end of said gear means being rotatably supported by the inner wall of said housing member and adapted to contact to said O-ring.

11. The electric remote control mirror apparatus according to claim 10, further comprising an annular washer member disposed between the other end of said gear means and said O-ring.

12. The electric remote control mirror apparatus according to claim 10, wherein said supporting means comprising;
   a ball base integrally formed with said housing member and having a concave surface,
   means for forming a through hole positioned at the central portion of said concave surface toward the inside of said housing member,
   a hollowed boss portion having a boss surface to be fitted to said concave surface and having a through hole positioned at the center of said hollowed boss portion, said hollowed boss portion being integrally formed with said mirror body,
   a pressure applying member having a through hole at the central portion of said pressure applying member, having a boss portion to be fitted to said inner surface of said hollowed boss portion of said mirror body,
   a bolt having a head portion at one end of said bolt and a screw portion at the other end of said bolt, said head portion being contacted to the top of said through hole of said pressure applying member, said bolt being inserted into said housing member through said through hole of said pressure applying member, said through hole of said hollowed boss member and said through hole of said ball base,
   a spring stopper threadable into slidably mounted with respect to said housing member in the state that a rotation around the axis is inhibitted and said spring stopper screwed to be said screw portion of said bolt member, and
   a compression coil spring disposed between said inner surface of said housing member and said spring stopper.

13. An electric remote control mirror apparatus comprising;
   a mirror,
   a mirror body fixed to said mirror,
   a mirror housing for receiving said mirror body,
   supporting means fixed within said mirror housing for holding said mirror body in said mirror housing, said supporting means including a housing member fixed in said mirror housing and means for pivotably supporting said mirror body and connecting said mirror housing with said housing member,
   two ball bases mounted on the back side of said mirror body wherein one ball base lies on a lateral pivot axis of the mirror body and the other ball base lies on a longitudinal pivot axis of the mirror body and said lateral and longitudinal axes are perpendicular to one another,
   a pair of hollowed cylindrical threaded rods, each of which has an inner surface provided with screw threads and a ball portion at the end portion of said each threaded rod, said ball portion being adapted to be fitted to each of said ball bases respectively, and said pair of the hollowed cylindrical threaded rods being disposed in said ball bases, and each of said pair of hollowed cylindrical threaded rods being movable in its axial direction through a cylindrical hole mounted on said housing member,
   a pair of rotation members rotatably mounted in said housing member and having a plurality of arm members, and end portion of each of said arm members being formed with screw threads which are resiliently coupled to said screw thread portion of said threaded rod,
   gear means connected to each of said rotation members for transmitting a drive force to each of said rotation members, said gear means being formed in a hollowed cylinder for receiving said threaded rod and said rotation member, one end of said gear means being fixed to said rotation member and the other end of said gear means being rotatably supported by an inner wall of said housing member,
   a pair of guide members projected from said housing member in the direction substantially equal to the moving direction of said threaded rod, said paired guide members sandwiching an elongated projected piece mounted on the end portion of said threaded rod and extending in the direction substantially perpendicular to the moving direction of said threaded rod,
   opening means provided on said mirror body, through which the end portions of said paired guiding members are passed respectively,
   bar means slidably contacted with the opposite walls of said paired guiding members, and
   electric motor means for driving said rotation members through said gear means,
   said pivotably supporting means comprising, a ball base integrally formed with said housing member and having a concave surface; means for forming a through hole positioned at the central portion of said concave surface toward the inside of said housing member; a hollowed boss portion having a boss surface to be fitted to said concave surface and having a through hole positioned at said hollowed boss portion, said hollowed boss portion being integrally formed with said mirror body; a pressure applying member having a through hole at the central portion of said pressure applying member, having a boss portion to be fitted to said inner surface of said hollowed boss portion of said mirror body; a bolt having a head portion at one end of said bolt and a screw portion at the other end of said bolt, said head portion being contacted to the top of said through hole of said pressure applying member, said bolt being inserted into said housing member through said through hole of said pressure applying member, said through hole of said hollowed boss member and said through hole of said ball base; a spring stopper slidably mounted with respect to said housing member in the state that a rotation around the axis is inhibited and said spring stopper being adapted to be screwed to said screw portion of said bolt member; and a compression coil spring disposed between said inner surface of said housing member and said spring stopper, and
   resilient O-rings fixedly disposed in said housing member and contacting the respective outer surfaces of said threaded rods, such that each threaded rod is supported by said housing member, said O-rings being disposed at the inner side of the cylindrical hole of said housing member into which each of said threaded rods is inserted.

* * * * *